United States Patent [19]

Onnie

[11] Patent Number: 4,946,552
[45] Date of Patent: Aug. 7, 1990

[54] METHOD OF MAKING A CARDBOARD COMPOSITE PATTERN

[76] Inventor: Grant L. Onnie, 301 Academy St., Ferndale, Mich. 48220

[21] Appl. No.: 302,372

[22] Filed: Jan. 27, 1989

[51] Int. Cl.[5] .............................................. B29C 67/22
[52] U.S. Cl. .................................... 156/250; 264/46.6; 264/138; 264/154; 264/219
[58] Field of Search ...................... 264/46.6, 46.4, 145, 264/219, 138, 154; 156/250

[56] References Cited

U.S. PATENT DOCUMENTS

| | | | |
|---|---|---|---|
| 3,248,758 | 5/1966 | Schmitz et al. | 264/219 |
| 4,049,309 | 9/1977 | Seal | 264/219 |
| 4,055,613 | 10/1977 | Kapral | 264/46.4 |
| 4,073,049 | 2/1978 | Lint | 264/219 |
| 4,474,722 | 10/1984 | Martin | 264/219 |

*Primary Examiner*—Jan H. Silbaugh
*Assistant Examiner*—Allan R. Kuhns
*Attorney, Agent, or Firm*—William L. Fisher

[57] ABSTRACT

Method of making a pattern for a prototype mold including making a cardboard composite pattern which simulates a prototype part to be molded as the latter is disposed in die position, the method including building up a box-like structure of glued-together cardboard templates and cardboard surface parts, the templates upstanding from a grid base in accordance with a design drawing for the prototype part, the surface parts providing the exterior surface for the cardboard composite pattern save for the curved surfaces thereof, the curved exterior surfaces being imparted to the cardboard composite pattern by the following steps: (i) coating the interior of the box-like structure with a two-part foam material that sets up into a rigid mass; (ii) thereafter cutting the surface parts along a tangent line and where else curvature is needed for the cardboard composite pattern to expose the hardened foam substrate and edges of the surface parts; and (iii) covering such exposed exterior surfaces with a pliable material and shaping same into the exterior curvature needed for the cardboard composite pattern, the cardboard composite pattern duplicating the exterior surfaces of the prototype part to within tolerances of plus or minus one millimeter.

2 Claims, 1 Drawing Sheet

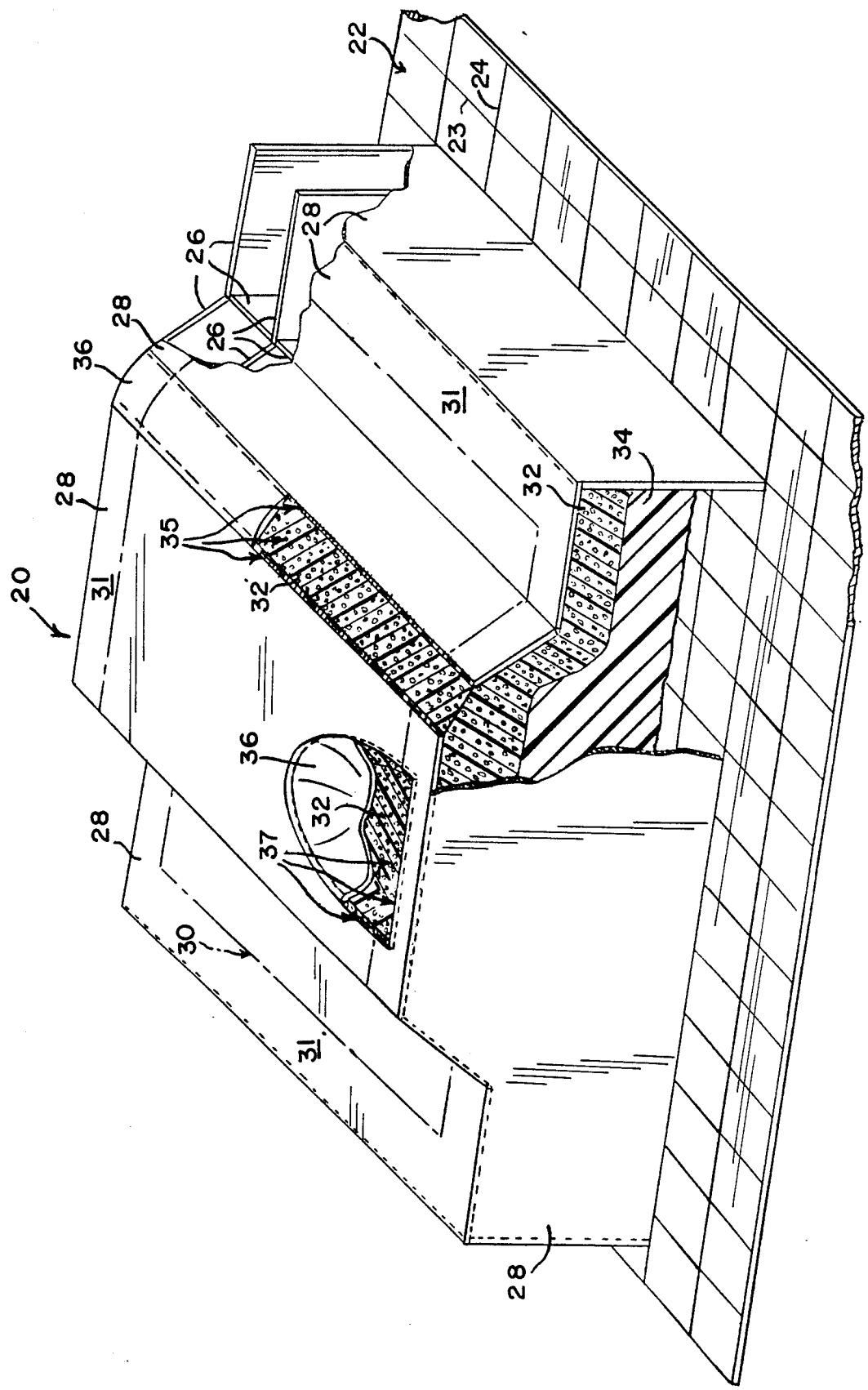

METHOD OF MAKING A CARDBOARD COMPOSITE PATTERN

My invention relates to the art of die making for producing metal or plastic parts in industry on a production basis and more specifically to making patterns for prototype molds.

Presently, in this art, wood patterns have to be carved of solid wood for use in making therefrom prototype molds of plaster or plastic from which sand castings are made as a further step in fabricating prototype stamping dies (usually of Kirksite, a trademark) or injection molding dies (usually of aluminum) for making prototype parts.

I have discovered an improvement in this art which is an acceptable alternative to making wood patterns with consequent savings, both in time and labor.

The principal object of my invention, and the advantages thereof, will become apparent, during the course of the following description, taken in conjunction with the accompanying drawing, in which the single FIGURE shown (FIG. 1) is a top perspective view, with structure cut-away for clarity's sake, of a cardboard composite pattern embodying my invention.

Referring to FIG. 1 in greater detail, the cardboard composite pattern shown therein is generally designated 20 and the process by which it is made is called the "CCP" process which term I use as a trademark when referring to my improved process or product thereof.

I commence with a flat base 22 of material which will maintain true flatness, such as, aluminum, other metal, marble or the like. The base is inscribed with a grid 23, 24, usually of 100 mm spacing, according to the part lay-out drawing for the part desired to be manufactured; the grid lines being numbered, as on said drawing. I then carefully locate on the base 22, via the grid 23, 24, a plurality of templates 26 and adhere them to the base 22 and to each other by gluing them with hot-melt glue or cyanoacrylate glue. I have successfully used "Thermogrip" (a trademark of Emhart Company of Reading Penna.) for hot-melt glue and "Superjet" (a trademark of C. G. Models Inc. of Chicago, Ill.) for cyanacrylate glue. The templates 26 upstand from the base 22 with their profiles cut to conform to said drawing and to support cardboard surface parts 28 which are glued on said templates 26 and to themselves, at their edges, as shown. The surface parts 28 and the templates 26 are made of cardboard of the type known as process board or mattboard. I have successfully used "Crescent Quality Cardboard" (a trademark of Crescent Cardboard Co. of Wheeling, Ill.) for such surface parts 28 and templates 26. The surface parts 28 are cut at their edges to conform to said drawing, but when adhered in edge to edge disposition on the templates 26, as shown, they simulate the prototype part in die position (unlike said drawing which shows same in design position). The cardboard composite pattern 20 duplicates the desired prototype part to within tolerances of plus or minus one millimeter. The cardboard composite pattern 20 has a trim edge, indicated by the phantom line 30; the peripheral part thereof beyond the trim edge 30 is indicated at 31 and called die run-off. After fabrication of the preliminary structure (consisting of the glued-together templates 26 and surface parts 28), the first step in my "CCP" process is to remove such preliminary cardboard structure off the base 22 containing the grid 23, 24 and, to preferably invert it, and spray the interior thereof with a two part polyurethane foam 32 which, before it foams and hardens (or sets), flows into the interior of the preliminary structure and covers the surface thereof with whatever thickness of substrate is desired. I have successfully used "Ireson's" (a trademark of Michigan Fiber Glass Sales Company of East Detroit, Mich.) Polyurethane Foam Component No. 1 (Catalyst) and Component No. 2 (Resin). After setting, the foam 32 becomes a rigid mass possessing a high load-bearing strength and light weight which characteristics it imparts to the preliminary cardboard structure. In spite of the rigidity of the foam 32, same may be cut-away with a knife or other cutting tool as a preliminary step to imparting curvature to the cardboard composite pattern 22 which is also why I use it as a substrate for the interior of the preliminary cardboard structure. Prior to imparting curvature to the cardboard composite pattern 20, I finish the preliminary cardboard structure by applying a second substrate to the interior thereof in the form of tooling clay 34 which is spread over the rigid foam 32 in whatever thickness is desired and allowed to set up or cure into a hardened mass to enhance the strength and weight-bearing qualities of the cardboard composite pattern 20. Most of presently available tooling clays can be used; I have successfully used the tooling clay which Tool Chemical Company of Ferndale, Mich. supplies. The tooling clay 34, like the foam 32, adheres to the inside walls of the preliminary cardboard structure, to itself, and to the foam 32 so as to strengthen the cardboard composite pattern 20. After application of the second substrate 34, to the interior of the preliminary cardboard structure, same is returned to the base 22 and located thereon via the grid 23,24. The next step of my "CCP" process is to cut the surface parts 28, where necessary, to impart the required curvature to the pattern 20. The cutting of the surface parts 28 exposes the edges thereof as well as the foam 32. In some cases, this is all the cutting that needs to be done as illustrated for the cutting indicated at 35 which is along a tangent line for the pattern 20 and which forms a chamfer that needs to be filled in with modeling clay 36 which is smoothed to form the desired radius. Most presently available modeling clays can be used; I have successfully used the modeling clay which the Russ Simpson Company of Warren, Mich. supplies. In other cases, the foam 32 must be cut elsewhere than along a tangent line as a preliminary step in imparting the required curvature to the pattern 20 as illustrated for the cutting indicated at 37 which forms a cavity beneath the plane of the surface parts 28. The curvature of the cavity formed by the cutting 37 is made by modeling clay 36 which is used to fill in any crevices or depressions in the cavity and smoothed to form the desired curvature. The modeling clay 36 which is made to adhere to both the exposed edges of the surface parts 28 and to the exposed foam 32 can be built up and smoothed into any solid surface curvature needed, such as, cylindrical, spherical, elliptical, hyperbolic or any combination thereof. After the required curvature is given to the pattern 20, same is coated with an hardenable sealant to fix its surface finish; i.e., to give it resistance to wetting from the mold material (plaster or plastic) to be poured over it and to render it capable of imparting a good impression to such mold material. I have had good success with shellac as such sealant. The final composite cardboard pattern 20, is an exact duplicate of the desired prototype part as the latter is disposed in die position and within said tolerances, however intricate or complex may be its surface contour. The final composite pattern 20 may duplicate either the outside dimensions of the prototype part or the inside dimensions thereof, whichever is specified.

It will thus be seen that there has been provided by my invention, my improved "CCP" process and my improved product of such process, being such a "CCP" cardboard composite pattern itself, wherein the above-stated object, together with many practical advantages, has been successfully achieved. For example, if wood patterns must be made, a large block of time must be alloted in any production schedule due to the labor-intensive nature of wood pattern making. My invention considerably compresses the time for production by accelerating that phase thereof involving pattern making and enables a manufacturer to go directly from a layout drawing to a "CCP" cardboard composite pattern and, thence, to a set of prototype molds of plaster or plastic. By my invention, the pattern making phase is decreased by more than half in terms of man hours. Likewise, the savings in material costs are more than twice that for wood patterns. While a preferred embodiment of my invention has been shown and described, it is to be understood that variations and changes may be resorted to from what I have disclosed herein without departing from the spirit of my invention as defined in the accompanying claims.

What I claim is:

1. Process for making a cardboard composite pattern comprising joining together a plurality of cardboard templates and cardboard surface parts disposed so as to simulate a prototype part as same will be positioned in a die position, the surface parts having such extent of surface area as to provide the cardboard composite pattern with its exterior surface save for curved surfaces thereof, the curved surfaces of the cardboard composite pattern being provided by the following steps:

(i) covering interior surfaces of the surface parts with a layer of an hardenable two-part foamable material and foaming said material into a rigid foam mass;

(ii) cutting said surface parts and said foam mass along tangent lines and wherever else curvature is needed to expose a foam substrate;

(iii) then covering such cut surface parts and cut foam substrate with a pliable material and shaping and smoothing said pliable material to form the curved surfaces for the cardboard composite pattern; and (iv) thereafter coating the cardboard surface parts and the curved surfaces of pliable material with an hardenable sealant to fix a surface finish of the cardboard composite pattern, the exterior surface of the cardboard composite pattern duplicating the desired prototype part to within tolerances of plus or minus one millimeter.

2. Method of making a pattern for a prototype mold comprising making a cardboard composite pattern which simulates a prototype part to be molded as the latter is disposed in die position, said method consisting of building up a box-like structure of glued-together cardboard templates and cardboard surface parts, said templates upstanding from a grid base in accordance with a design drawing for the prototype part, said surface parts providing an exterior surface for the cardboard composite pattern save for the curved exterior surfaces thereof, said curved exterior surfaces being imparted to the cardboard composite pattern by the following steps:

(i) coating an interior of the box-like structure with a two-part foamable material and foaming said material into a rigid foam mass;

(ii) thereafter cutting said surface parts and said foam mass along a tangent line and wherever else curvature is needed for the cardboard composite pattern to expose a hardened foam substrate and edges of the surface parts; and (iii) covering said substrate and said edges with a pliable material and shaping same into an exterior curvature needed for the cardboard composite pattern, and thereafter coating said exterior surface including said curvature to fix a surface finish of the cardboard composite pattern, said cardboard composite pattern duplicating the exterior surfaces of the prototype part to within tolerances of plus or minus one millimeter.

* * * * *